US012257680B2

(12) United States Patent
Lee et al.

(10) Patent No.: US 12,257,680 B2
(45) Date of Patent: Mar. 25, 2025

(54) WORK MACHINE

(71) Applicant: Koki Holdings Co., Ltd., Tokyo (JP)

(72) Inventors: Yen-ting Lee, Ibaraki (JP); Souki Hoshina, Ibaraki (JP); Keiki Nakaniwa, Ibaraki (JP); Hiroki Kitagawa, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 18/330,358

(22) Filed: Jun. 6, 2023

(65) Prior Publication Data

US 2023/0398669 A1 Dec. 14, 2023

(30) Foreign Application Priority Data

Jun. 10, 2022 (JP) ................................ 2022-094038

(51) Int. Cl.
*B25C 1/00* (2006.01)
*B25C 1/04* (2006.01)

(52) U.S. Cl.
CPC ................ *B25C 1/005* (2013.01); *B25C 1/04* (2013.01)

(58) Field of Classification Search
CPC ...................................................... B25C 1/005
See application file for complete search history.

(56) References Cited

U.S. PATENT DOCUMENTS 6,053,389 A * 4/2000 Chu ........................ B25C 1/005 227/119
2013/0320060 A1* 12/2013 Gregory .................. B25C 1/005 227/8

FOREIGN PATENT DOCUMENTS

JP 2004202674 7/2004

* cited by examiner

*Primary Examiner* — Nathaniel C Chukwurah
(74) *Attorney, Agent, or Firm* — JCIPRNET

(57) ABSTRACT

A nailing machine is a work machine, including: an ejection part to which a fastener is supplied; a striking part, striking the fastener supplied to the ejection part; a magazine part, having one end in a first direction attached to the ejection part, and movably supporting the fastener in the first direction; and a feeder part, supported by the magazine part while being movable in the first direction, and pushing the fastener toward one side in the first direction. The feeder part includes a contact part that contacts the fastener. The magazine part includes a first and a second guide rail arranged apart in a second direction orthogonal to the first direction and facing each other with a feeder member therebetween. A gap between the first and second guide rails in the second direction is smaller than a width of the contact part in the second direction.

12 Claims, 12 Drawing Sheets

WORK MACHINE

CROSS-REFERENCE TO RELATED APPLICATIONS

This application claims the priority benefit of Japan Application No. 2022-094038, filed on Jun. 10, 2022. The entirety of the above-mentioned patent application is hereby incorporated by reference herein and made a part of this specification.

BACKGROUND

Technical Field

The disclosure relates to a work machine.

Related Art

As an example of a work machine, a nailing machine is known that strikes a fastener by driving a piston with compressed air. The nailing machine is provided with a magazine that supports a plurality of fasteners and a feeder that slides in the magazine to thereby supply the fasteners to an ejection part. Patent Document 1 (Japanese Patent Laid-Open No. 2004-202674) describes a nailing machine (driving tool) in which a material of a magazine includes iron.

In the nailing machine described in Patent Document 1, since the magazine is made of iron, the mass of a product tends to increase, and there has been a demand for weight reduction in order to improve workability. While it is possible to reduce the weight of the magazine by making the magazine out of aluminum, if a feeder made of iron is configured to slide on the magazine made of aluminum, the magazine may wear out and may be reduced in durability. Hence, the following configuration is conceivable. A rail part that guides the feeder is provided on both inner wall surfaces of a lower groove of a guide passage formed in the magazine, and the feeder is configured to move while being sandwiched between the rail parts, thereby reducing the area of direct sliding between the feeder and the magazine. In this case, the guide passage needs to be narrowed to avoid poor nail feeding. Hence, a pusher that moves while being sandwiched between the rail parts also needs to be reduced in width.

However, when the number of nails in the magazine is small, if the pusher and a driver blade collide, sufficient strength may not be provided in a narrow pusher, and the pusher may be damaged.

SUMMARY

A work machine according to one embodiment includes: an ejection part to which a fastener is supplied; a striking part, striking the fastener supplied to the ejection part; a magazine part, having one end in a first direction attached to the ejection part, and movably supporting the fastener in the first direction; and a feeder part, supported by the magazine part while being movable in the first direction, and pushing the fastener toward the one side in the first direction. The feeder part includes a contact part that comes into contact with the fastener. The magazine part includes a first rail and a second rail that are arranged apart in a second direction orthogonal to the first direction and facing each other with the feeder part therebetween. A gap between the first rail and the second rail in the second direction is smaller than a width of the contact part in the second direction.

A work machine according to one embodiment includes: an ejection part to which a fastener is supplied; a striking part, striking the fastener supplied to the ejection part; a magazine part, having one end in a first direction attached to the ejection part, and movably supporting the fastener in the first direction; and a feeder part, supported by the magazine part while being movable in the first direction, and pushing the fastener toward the one side in the first direction. The magazine part includes a rail part that is formed in a columnar shape extending in the first direction and slides against the feeder part on a side surface, a base that includes a fitting part to which the rail part is fitted so that a portion of the side surface of the rail part is exposed, and a pullout prevention part that is inserted through the base so as to protrude from the fitting part.

A work machine according to one embodiment includes: an ejection part to which a fastener is supplied; a striking part, striking the fastener supplied to the ejection part; a magazine part, having one end in a first direction attached to the ejection part, and movably supporting the fastener in the first direction; a feeder part, supported by the magazine part while being movable in the first direction, and pushing the fastener toward the one side in the first direction; a housing, supporting the ejection part and the striking part; and a plurality of fixing members, including a shaft and a large diameter portion, and fixing the magazine part to the housing by inserting the shaft through the magazine part and the housing. The magazine part includes a wall of a plate-like shape that defines an accommodation space accommodating the feeder part and allows the plurality of fixing members to be inserted therethrough. The wall includes a plurality of accommodation parts that accommodate the large diameter portion provided in each of the plurality of fixing members.

DESCRIPTION OF THE EMBODIMENTS

Figure 1:
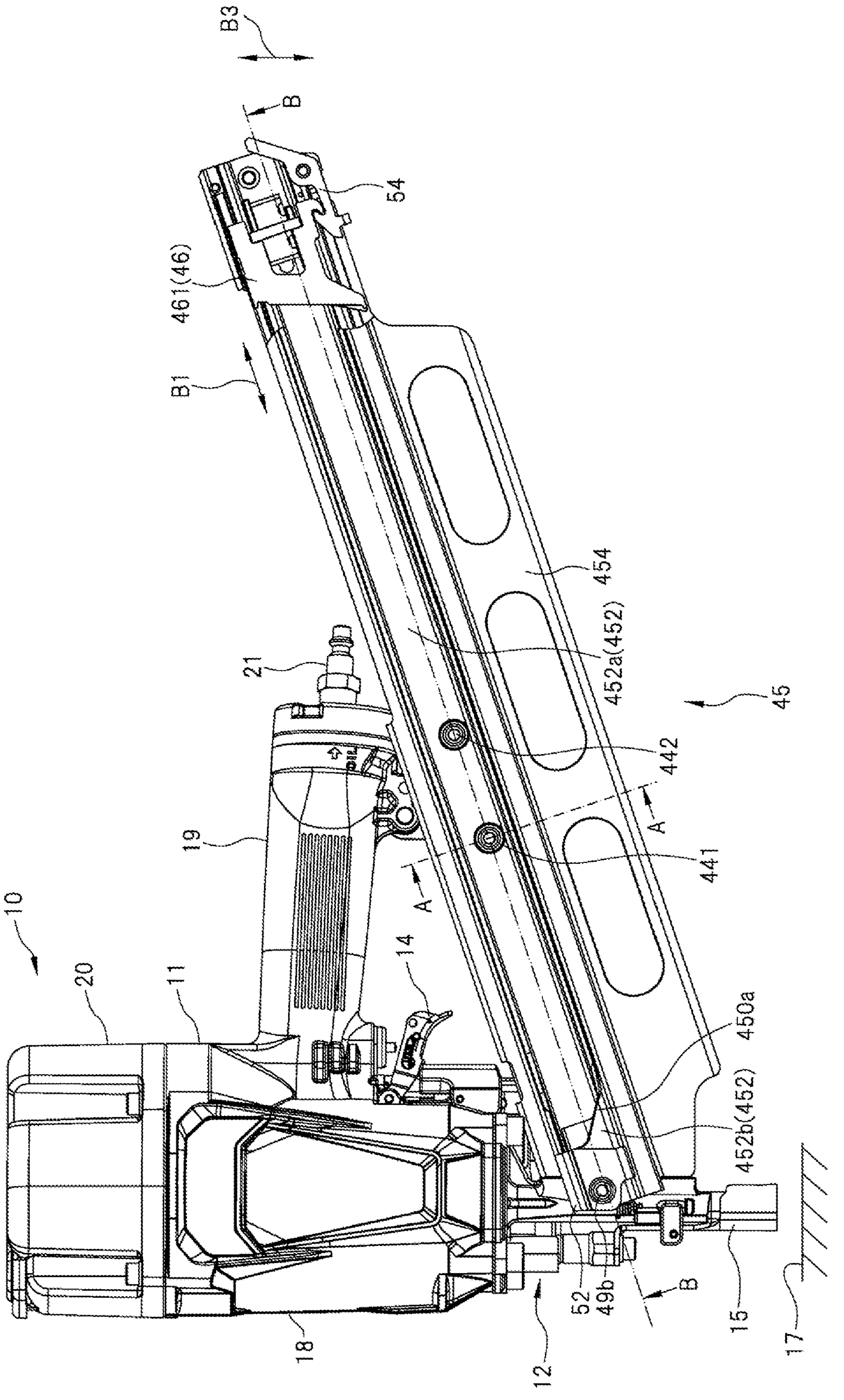
FIG. 1 is an external view illustrating a nailing machine being an example of a work machine according to an embodiment.

According to the disclosure, workability can be improved.

A work machine of the present embodiment will be described with reference to the drawings. In the present embodiment, a nailing machine is adopted and described as an example of the work machine.

A nailing machine 10 of the present embodiment illustrated in FIG. 1 to FIG. 6 includes a housing (main body) 11, an ejection part 12, a striking part 13, a trigger 14, and a push lever 15.

<Housing 11>

The housing 11 includes a striking part accommodation part 18, a handle 19, a head cover 20, and a handle arm 42 that connects a magazine part 45 described later to the handle 19. The striking part accommodation part 18 is of a tubular shape (see FIG. 3), and the handle 19 is connected to the striking part accommodation part 18. The head cover 20 is fixed to one end of the striking part accommodation part 18 in a longitudinal direction and closes an opening of the striking part accommodation part 18. The ejection part 12 is also called a nose and is fixed to the other end of the striking part accommodation part 18 in the longitudinal direction. The handle 19 is provided with a plug 21, and an air hose is connected to the plug 21.

Figure 6:
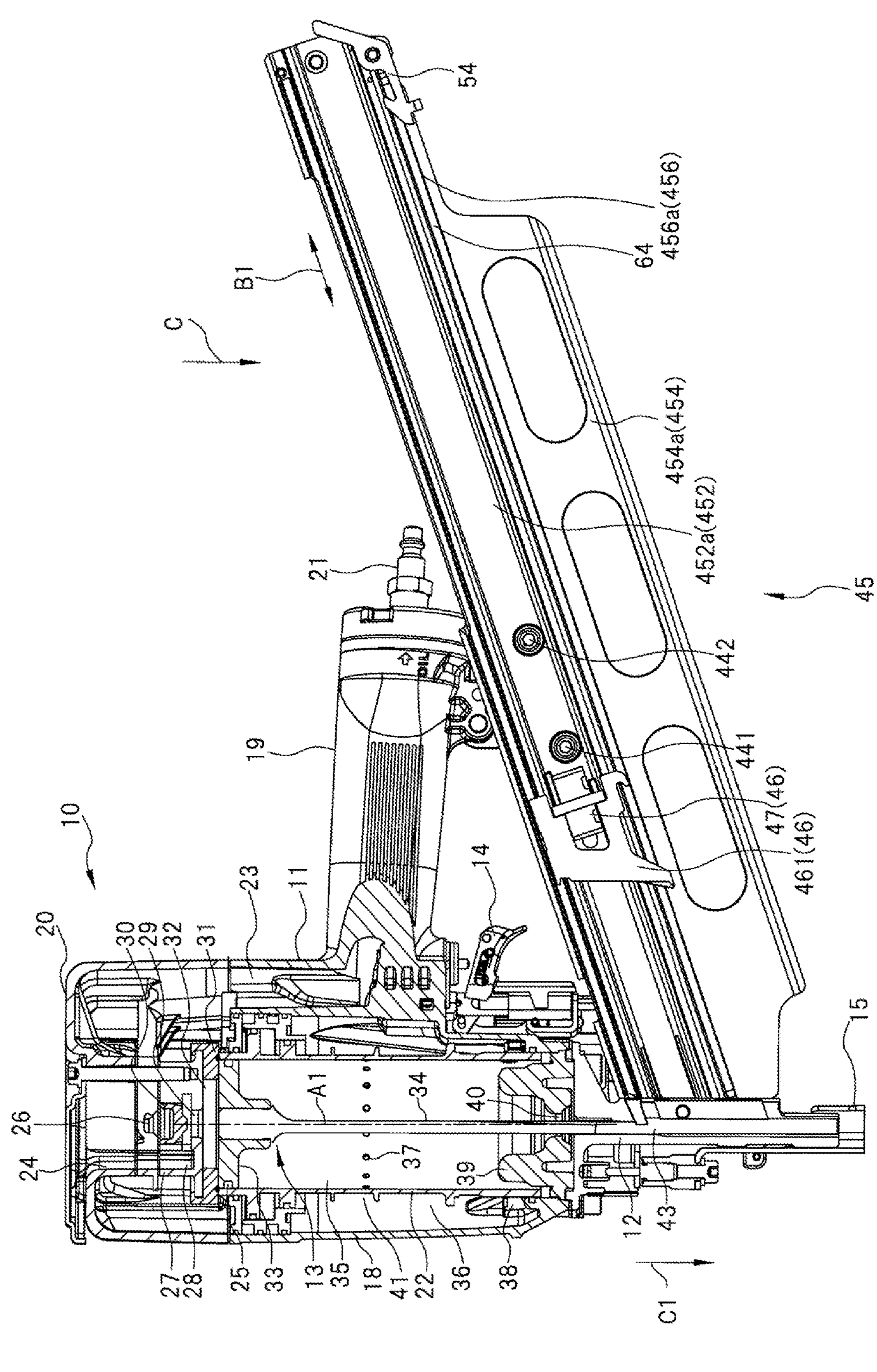
FIG. 6 is a side view illustrating an internal structure of the nailing machine illustrated in FIG. 1 with a portion thereof cut away.

As illustrated in FIG. 6, a cylinder 22 is provided inside the striking part accommodation part 18. The cylinder 22 is movable in a direction along a center line A1 with respect to the housing 11. The center line A1 is a center line of the cylinder 22. The striking part 13 whose details will be described later is arranged across the inside and outside of the cylinder 22. The striking part 13 is operable in the direction along the center line A1 with respect to the cylinder 22.

A pressure accumulation chamber 23 is provided across the inside of the handle 19, the inside of the striking part accommodation part 18, and the inside of the head cover 20. Compressed air supplied via the air hose is stored in the pressure accumulation chamber 23.

The head cover 20 includes a passage 24 and an exhaust valve chamber 26. The passage 24 is connected to the outside of the housing 11. Furthermore, a mount 27 is attached to the head cover 20.

The mount 27 includes a passage 28 and a passage 29. The passage 29 is connected to the passage 24 via the passage 28. The mount 27 supports an exhaust valve 30. The exhaust valve 30 is movable in the direction along the center line A1 with respect to the mount 27. When the exhaust valve 30 operates, the passage 29 is opened and closed. A valve seat 31 is attached to the mount 27. The valve seat 31 is made of synthetic rubber, and includes a piston upper chamber 32. The piston upper chamber 32 is connected to the passage 29.

Inside the cylinder 22, in the direction along the center line A1, a piston lower chamber 35 is provided between a piston 33 of the striking part 13 and the ejection part 12 described later. A seal member 25 seals the piston lower chamber 35. A return air chamber 36 is provided between the striking part accommodation part 18 and the cylinder 22. A passage 37 and a passage 38 penetrating the cylinder 22 in a radial direction are provided. Furthermore, a check valve 41 is provided on an outer peripheral surface of the cylinder 22. The check valve 41 operates by the pressure inside the cylinder 22 and opens and closes the passage 37. The passage 38 connects the piston lower chamber 35 and the return air chamber 36. The passage 38 is arranged between the passage 37 and the ejection part 12 in the direction along the center line A1.

A bumper 39 is provided inside the cylinder 22. The bumper 39 is arranged in a position inside the cylinder 22 closest to the ejection part 12 in the direction of the center line A1. The bumper 39 is made of synthetic rubber or silicone rubber. The bumper 39 includes a shaft hole 40, and a driver blade 34 is movable in the direction of the center line A1 within the shaft hole 40. Inside the cylinder 22, the piston lower chamber 35 is formed between the piston 33 and the bumper 39.

<Striking Part 13>

The striking part 13 is accommodated in the striking part accommodation part 18 of a tubular shape, and includes the piston 33 and the driver blade 34. The piston 33 is provided inside the cylinder 22 and is operable in the direction along the center line A1 with respect to the cylinder 22. The piston 33 is pushed away from the valve seat 31 in the direction along the center line A1 by the pressure of the piston upper chamber 32. The seal member 25 is attached to an outer peripheral surface of the piston 33. The seal member 25 contacts an inner peripheral surface of the cylinder 22. The driver blade 34 attached to the piston 33 is a member that moves to a side where a fastener protrudes in the direction along the center line A1, and strikes a nail (fastener) located in the ejection part 12.

<Ejection Part 12>

The ejection part 12 is fixed to the striking part accommodation part 18 and includes an injection path 43. The injection path 43 is connected to the shaft hole 40. The driver blade 34 is movable in the direction along the center line A1 within the shaft hole 40 and the injection path 43, and ejects a nail.

The push lever 15 is attached to the ejection part 12. The push lever 15 is operable in the direction along the center line A1 with respect to the housing 11 and the ejection part 12. The push lever 15 is pushed away from the housing 11 by a pushing member (not illustrated). When a tip of the push lever 15 is pressed against a mating material 17 (see FIG. 1), the push lever 15 is operable in a direction approaching the housing 11 by a pushing force of the above pushing member in this way.

<Magazine Part 45>

Figure 2A:
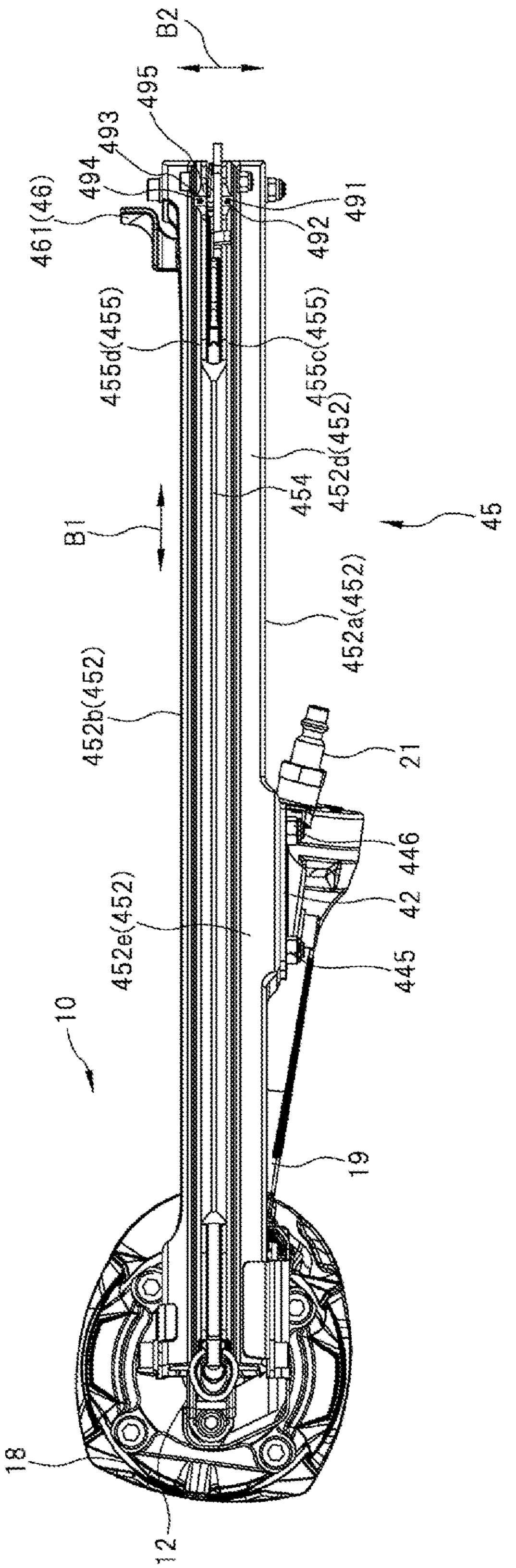
FIG. 2A is an external view of a lower surface side of the nailing machine illustrated in FIG. 1.
Figure 2B:
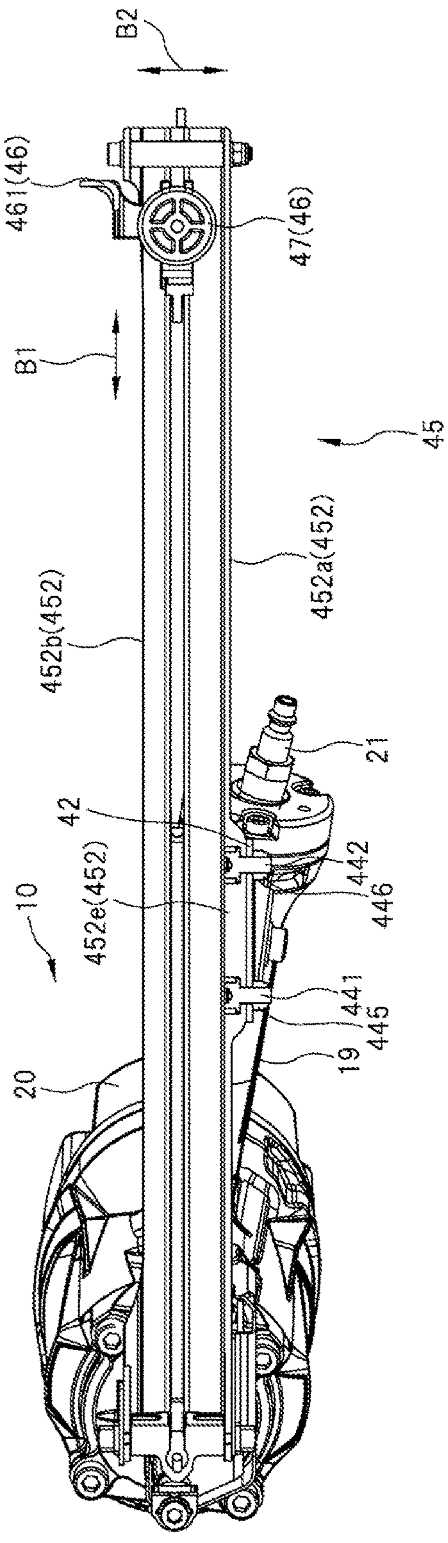
FIG. 2B is a cross-sectional view of the nailing machine illustrated in FIG. 1 taken along line B-B.
Figure 3:
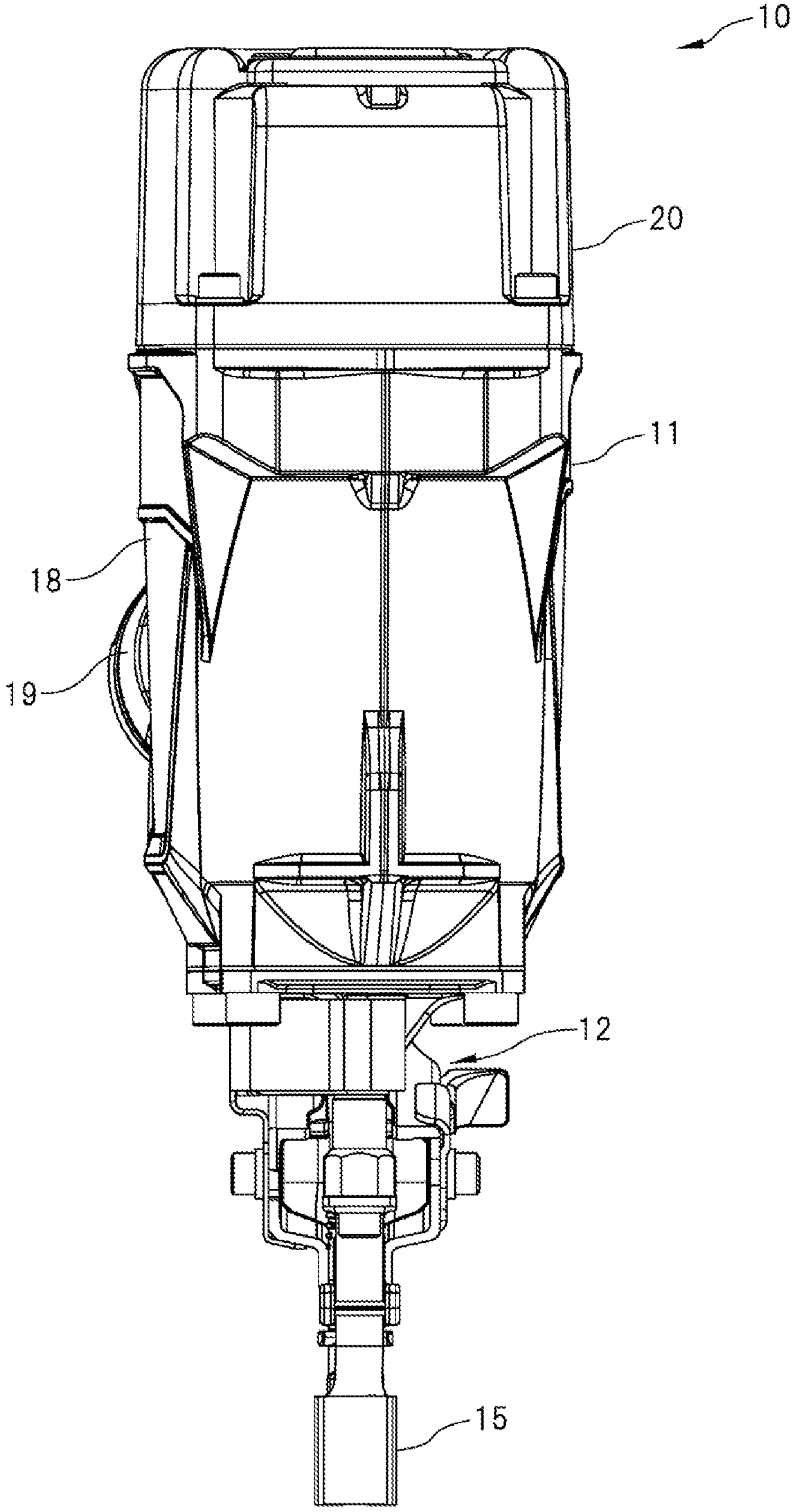
FIG. 3 is a front view illustrating a structure of the nailing machine illustrated in FIG. 1.

As illustrated in FIG. 1, FIG. 2A and FIG. 2B, the magazine part 45 is attached to the nailing machine 10. The magazine part 45 is manufactured by extrusion molding using aluminum as a material. The magazine part 45 may also be made of an aluminum alloy. The magazine part 45 is able to accommodate a plurality of nails being fasteners. The magazine part 45 is supported by the ejection part 12 and the handle 19. That is, the magazine part 45 is a member extending in a first direction B1, having one end in the first direction B1 attached to the ejection part 12, and movably supporting a nail in the first direction B1.

Figure 4:
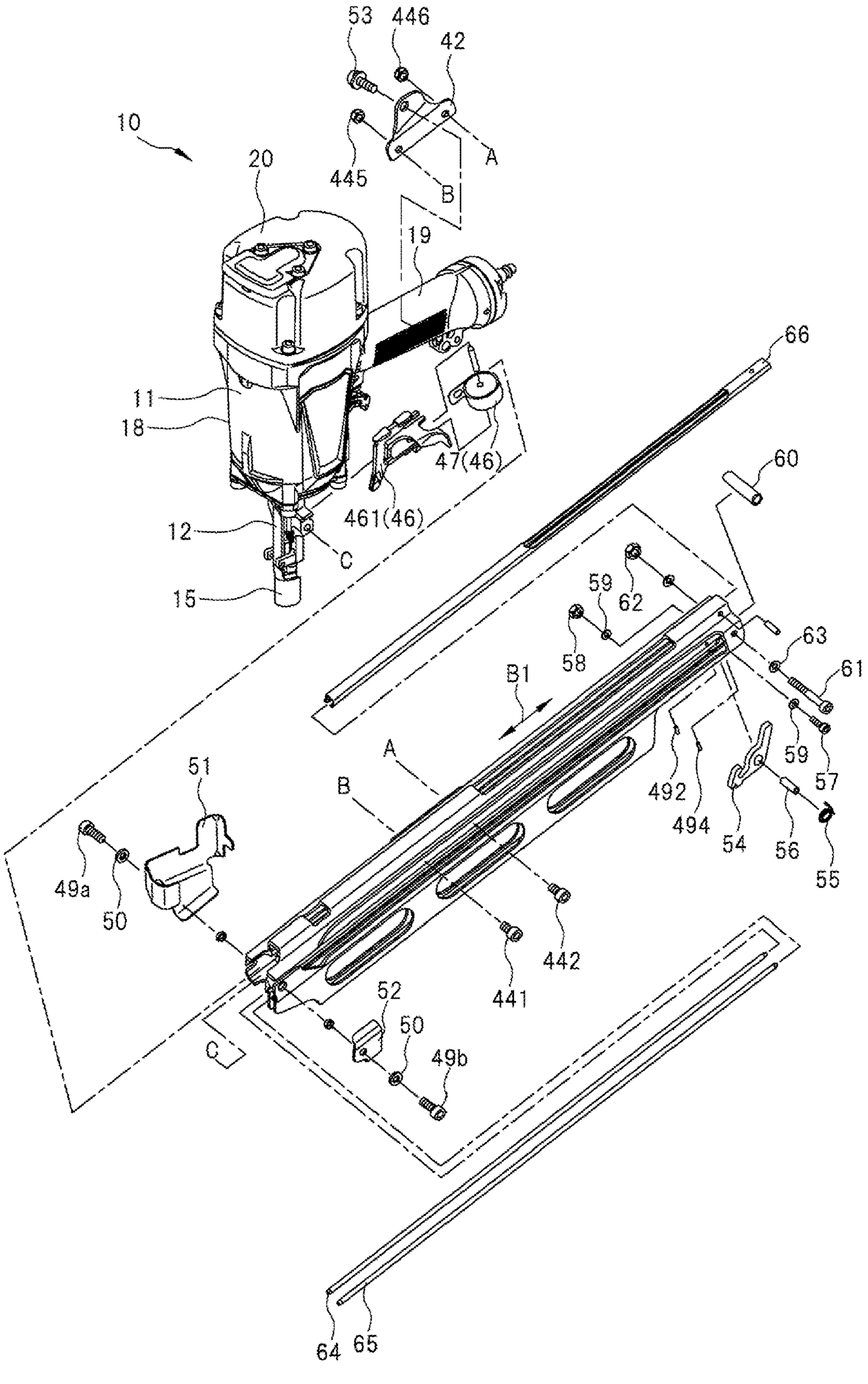
FIG. 4 is an exploded view illustrating the structure of the nailing machine illustrated in FIG. 1.

The magazine part 45 accommodates a feeder part 46 being a nail supply part, the feeder part 46 including a feeder member 461 and a coil spring 47 illustrated in FIG. 4. Specifically, the feeder part 46 is supported by the magazine part 45 while being movable in the first direction B1 and pushes a nail toward one side (ejection part 12 side) in the first direction B1. The coil spring 47 pushes the nail to the ejection part 12 side in the first direction B1 via the feeder member 461. That is, the feeder part 46 sends the nail to the ejection part 12 by a pushing force of the coil spring 47.

A hook 54 is attached to a rear end side of the magazine part 45. The hook 54 is a member that fixes the feeder part 46 that has been moved to the rear end side of the magazine part 45, so that the feeder part 46 is prevented from returning to the ejection part 12 side. The hook 54 is attached to the rear end of the magazine part 45 by a bolt 57 and a nut 58 via a spring 55, a sleeve 56, and a washer 59. That is, when a plurality of connected nails are loaded into the magazine part 45, by moving the feeder part 46 to the rear end of the magazine part 45 and fixing the feeder part 46 by the hook 54, the feeder part 46 is prevented from returning to the ejection part 12 side. In this state, the plurality of connected nails are loaded into the magazine part 45. After the nails have been loaded into the magazine part 45, by being released from the fixation by the hook 54, the feeder part 46 pushes the plurality of connected nails to the ejection part 12 side by the pushing force of the coil spring 47. Details of the feeder part 46 will be described later.

As illustrated in FIG. 4, in the nailing machine 10, the handle arm 42 connecting the handle 19 and the magazine part 45 is provided as a connecting part. The handle arm 42 is attached to a lower surface side of the handle 19 by a bolt 53. A detailed structure of the magazine part 45 will be described later.

<Operation of Nailing Machine 10>

An example of an operation of the nailing machine 10 when a nail is driven into the mating material 17 using the nailing machine 10 is described. As illustrated in FIG. 1, when a user applies an operating force to the trigger 14 and the push lever 15 is pressed against the mating material 17 and pushed, the pressure of the pressure accumulation chamber 23 illustrated in FIG. 6 is transmitted to the piston upper chamber 32, and the piston 33 and the driver blade 34 are lowered. The driver blade 34 strikes the nail. The struck nail is driven into the mating material 17.

During lowering of the striking part 13, when the seal member 25 moves to between the passage 37 and the bumper 39, the check valve 41 operates by the pressure of the compressed air flowing into the cylinder 22, and opens the passage 37. Hence, a portion of the compressed air in the cylinder 22 flows into the return air chamber 36 through the passage 37. Accordingly, when the striking part 13 is lowered and the piston 33 collides with the bumper 39, the bumper 39 absorbs a portion of kinetic energy of the striking part 13. The striking part 13 stops at a bottom dead center. When the striking part 13 stops at the bottom dead center, the piston 33 is pressed against the bumper 39, and the piston 33 cuts off the inside of the cylinder 22 and the shaft hole 40 from each other.

When the push lever 15 is separated from the mating material 17 due to a reaction of the striking part 13 driving the nail into the mating material 17, the push lever 15 operates by the pushing force of the pushing member (not illustrated) and stops in an initial position. Then, the compressed air in the exhaust valve chamber 26 is discharged to the outside. Furthermore, the exhaust valve chamber 26 operates and connects the passage 29 and the passage 28, and the compressed air in the piston upper chamber 32 is discharged to the outside. When the pressure of the piston upper chamber 32 drops, the piston 33 rises due to the pressure of the compressed air supplied from the return air chamber 36 to the piston lower chamber 35. The piston 33 contacts the valve seat 31, and the striking part 13 stops at a top dead center.

<Detailed Structure of Magazine Part 45>

Details of the magazine part 45 are further described with reference to FIG. 7 to FIG. 11B.

Figure 5:
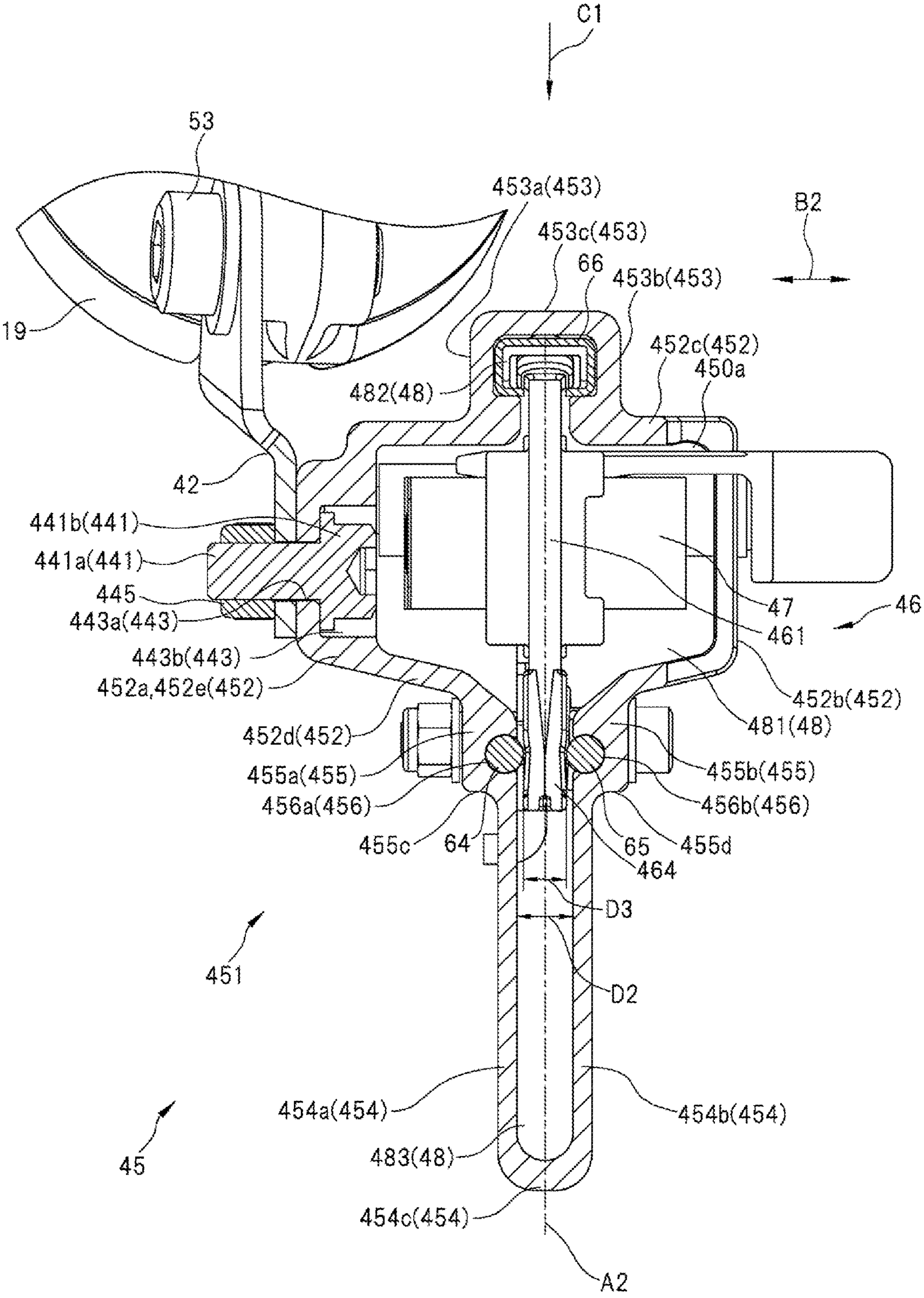
FIG. 5 is a cross-sectional view of the nailing machine illustrated in FIG. 1 taken along line A-A.

As illustrated in FIG. 5, the magazine part 45 is constituted by a wall 451 that defines an accommodation space 48 accommodating the feeder part 46. The accommodation space 48 includes a first accommodation space 481, a second accommodation space 482, and a third accommodation space 483. In the first accommodation space 481, the coil spring 47 having one end fixed to the ejection part 12, the feeder member 461 movable integrally with the coil spring 47 in the first direction B1, and a central part of a nail are accommodated. The second accommodation space 482 is formed above the first accommodation space 481, and accommodates an upper part 463 (see FIG. 11A and FIG. 11B) of the feeder member 461 and a nail head (portion on the upper side) of the nail. The third accommodation space 483 is formed below the first accommodation space 481, and accommodates a contact part 464 in a lower part of the feeder member 461 and a nail foot (portion on the lower side) of the nail. The wall 451 includes a first wall 452 that defines the first accommodation space 481, a second wall 453 that defines the second accommodation space 482, and a third wall 454 that defines the third accommodation space 483.

As illustrated in FIG. 4 and FIG. 5, the magazine part 45 includes a first guide rail (rail part, first rail) 64, a second guide rail (rail part, second rail) 65, and a third guide rail 66 that guide movement of the feeder member 461 and the nail in the first direction B1. The first guide rail 64, the second guide rail 65 and the third guide rail are made of, for example, steel, and extend along the first direction B1. That is, the first guide rail 64, the second guide rail 65 and the third guide rail 66 are superior to the magazine part 45 made of aluminum in terms of wear resistance, strength and the like.

<First Wall 452>

The first wall 452 has a side surface 452*a* and a side surface 452*b* arranged on both sides of a magazine center line A2, an upper surface 452*c* arranged on the upper side (handle 19 side) of the side surfaces 452*a* and 452*b*, and a lower surface 452*d* arranged on the lower side of the side surfaces 452*a* and 452*b*. The side surfaces 452*a* and 452*b*, the upper surface 452*c*, and the lower surface 452*d* are plate-like members whose longitudinal direction is along the first direction B1. At a tip (ejection part 12 side) of the side surface 452*b*, a slit 450 (see FIG. 9) extending along the first direction B1 and an opening 450*a* connected to the slit 450 and formed up to the vicinity of the rear end of the magazine part 45 are formed. By forming the opening 450*a*, it is suppressed that an impact sound generated when the nail is struck by the striking part 13 resonates inside the magazine part 45 and generates a loud noise.

Figure 8A:
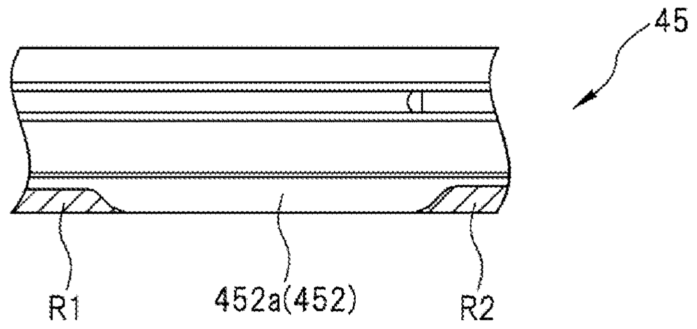
FIG. 8A, FIG. 8B, and FIG. 8C are cross-sectional views illustrating a portion of the magazine part of the nailing machine illustrated in FIG. 2B.

The first wall 452 includes, in a portion of the side surface 452*a*, a region (hereinafter referred to as fixed region 452*e*) fixed with the handle arm 42 as described later. The fixed region 452*e* is a thick portion having a thickness (size along the second direction B2) greater than a thickness (size along the second direction B2) of another side surface 452*a* adjacent to the fixed region 452*e* in the first direction B1. The fixed region 452*e* is formed by cutting a region other than the fixed region 452*e* out of an outer wall surface (surface on a side not facing the magazine center line A2) of the side surface 452*a* of the first wall 452 manufactured by extrusion molding. FIG. 8A is a cross-sectional view of a portion of the magazine part 45 after extrusion molding. In the side surface 452*a* illustrated in FIG. 8A, by cutting a region R1 and a region R2 indicated by hatching, the fixed region 452*e* is formed in the side surface 452*a*.

Figure 8B:
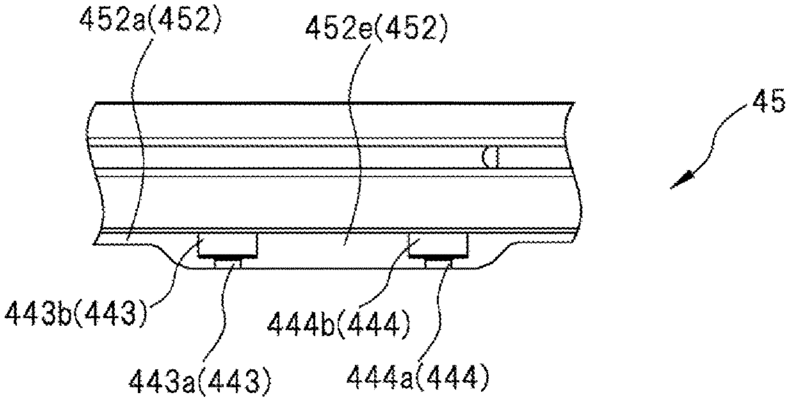

In the fixed region 452*e* being a thick portion, a bolt hole 443 and a bolt hole 444 are formed into which a bolt 441 and a bolt 442 being fixing members that fix the handle arm 42 are respectively inserted. As illustrated in FIG. 8B, the bolt holes 443 and 444 are formed by machining after the fixed region 452*e* is formed by cutting described above.

Figure 8C:
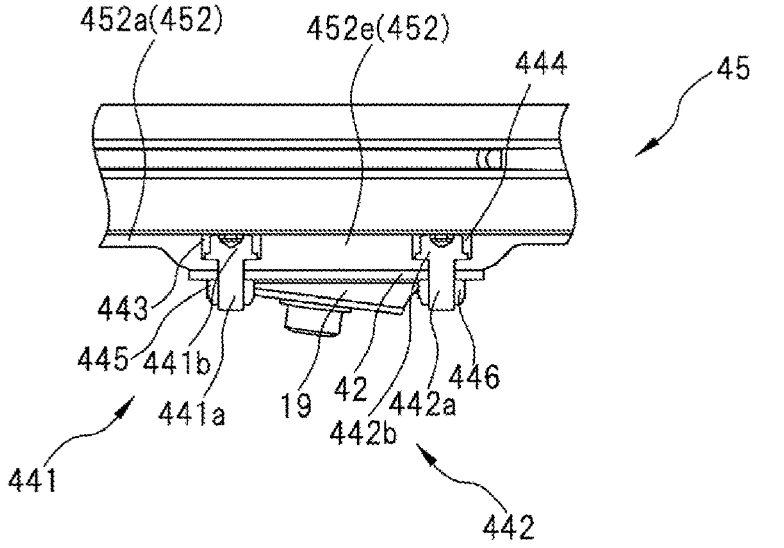
Figure 9:
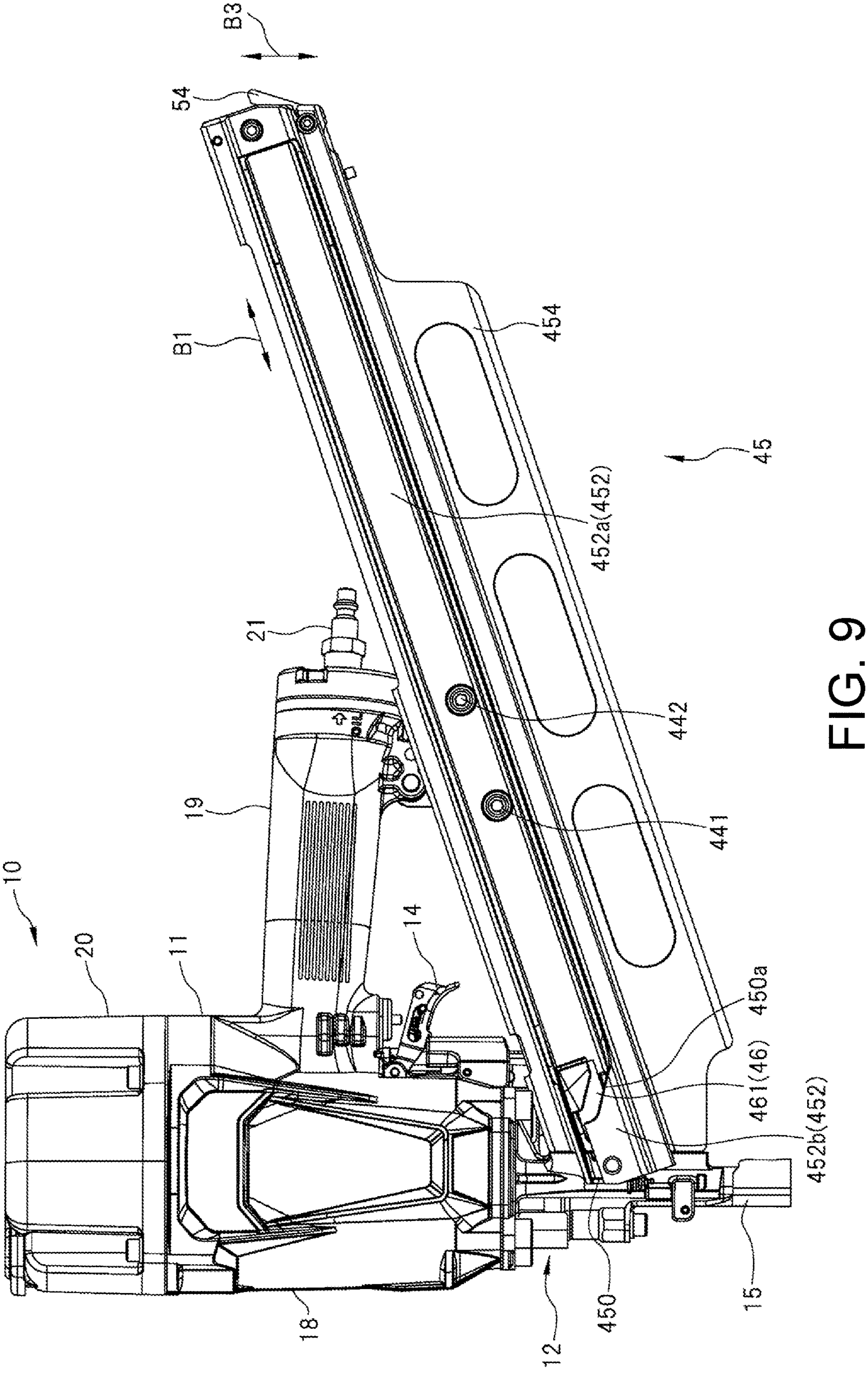
FIG. 9 is a side view illustrating a state in which a magazine guard has been removed from the nailing machine illustrated in FIG. 1.

As illustrated in FIG. 5 and FIG. 8C, the bolt 441 includes a shaft 441*a* and a large diameter portion 441*b*, and the bolt 442 includes a shaft 442*a* and a large diameter portion 442*b*. The bolts 441 and 442 are fixing members that fix the magazine part 45 to the housing 11 by inserting the shafts 441*a* and 442*a* into the magazine part 45 and the handle 19 of the housing 11 via the handle arm 42.

The bolt hole 443 includes a small diameter hole 443*a* into which the shaft 441*a* of the bolt 441 is inserted and a large diameter hole 443*b* being an accommodation part accommodating the large diameter portion 441*b* of the bolt 441; the bolt hole 444 includes a small diameter hole 444*a* into which the shaft 442*a* of the bolt 442 is inserted and a large diameter hole 444*b* being an accommodation part accommodating the large diameter portion 442*b* of the bolt 442. That is, the fixed region 452*e* is a region in which the large diameter holes 443*b* and 444*b* being a plurality of accommodation parts are formed, and the first wall 452 includes the large diameter holes 443*b* and 444*b* accommodating the large diameter portions 441*b* and 442*b* of a plurality of bolts 441 and 442.

The number of the bolt holes 443 and 444 formed corresponds to the number of bolts used for fixing the handle arm 42 and the magazine part 45.

As illustrated in FIG. 8C, the fixed region 452*e* and the handle arm 42 are fixed by the bolt 441 and the bolt 442 respectively inserted into the bolt hole 443 and the bolt hole 444 formed as described above as well as by a nut 445 and a nut 446. Accordingly, the magazine part 45 is fixed to the handle 19.

<Second Wall 453>

The second wall 453 includes a side surface 453*a* and a side surface 453*b* connected to the upper surface 452*c* of the first wall 452 and arranged on both sides of the magazine center line A2, and an upper surface 453*c* arranged on the upper side (handle 19 side) of the side surfaces 453*a* and 453*b*. The third guide rail 66 is inserted from the rear end of the magazine part 45 along an inner wall of the second wall 453. The third guide rail 66 is made of, for example, steel, has a cross-sectional shape along the inner wall of the second wall 453, and has a shape extending along the first direction B1.

<Third Wall 454>

The third wall 454 includes a base 455*a* and a base 455*b* (collectively referred to as base 455) connected to the lower surface 452*d* of the first wall 452, a side surface 454*a* and a side surface 454*b* arranged on both sides of the magazine center line A2 on a bottom surface 455*c* of the base 455*a* and a bottom surface 455*d* of the base 455*b*, and an upper surface 454*c* arranged on the lower side of the side surfaces 454*a* and 454*b*. A gap (separation distance) along the second direction B2 between the side surface 454*a* and the side surface 454*b* of the third wall 454 is smaller than a gap (separation distance) along the second direction B2 between the side surface 452*a* and the side surface 452*b* of the first wall 452.

On a surface (inner wall surface) on the magazine center line A2 side of the bases 455*a* and 455*b*, a fitting part 456*a* and a fitting part 456*b* (collectively referred to as fitting part 456) are formed to which the first guide rail 64 and the second guide rail 65 described later are fitted. The fitting part 456*a* and the fitting part 456*b* are formed in positions facing each other across the magazine center line A2. The fitting part 456 is formed with a cross-sectional shape according to the cross-sectional shape of the first guide rail 64 and the second guide rail 65 of a columnar shape extending along the first direction B1 and in which a portion of the fitted first guide rail 64 and the fitted second guide rail 65 is exposed to the third accommodation space 483.

The first guide rail 64 is inserted from a tip (ejection part 12 side) of the magazine part 45 into the fitting part 456*a* formed in the base 455*a* and is mounted on the magazine part 45 (see FIG. 4). As illustrated in FIG. 5, the fitting part 456*a* has a diameter corresponding to a diameter of the first guide rail 64. A distance along the second direction B2 from the inner wall surface (surface on the magazine center line A2 side) of the base 455*a* to a central axis of the fitting part 456*a* is shorter than the diameter of the fitting part 456*a*. Accordingly, a portion of the first guide rail 64 fitted to the fitting part 456*a* is exposed on the magazine center line A2 side from the inner wall surface of the base 455*a*.

The second guide rail 65 is inserted from the tip (ejection part 12 side) of the magazine part 45 into the fitting part 456*b* formed in the base 455*b* and is mounted on the magazine part 45 (see FIG. 4). As illustrated in FIG. 5, the fitting part 456*b* has a diameter corresponding to a diameter of the second guide rail 65. A distance along the second direction B2 from the inner wall surface (surface on the magazine center line A2 side) of the base 455*b* to a central axis of the fitting part 456*b* is shorter than the diameter of the fitting part 456*b*. Accordingly, a portion of the second guide rail 65 fitted to the fitting part 456*b* is exposed on the magazine center line A2 side from the inner wall surface of the base 455*b*.

The first guide rail 64 and the second guide rail 65 attached as described above are arranged apart in the second direction B2 and facing each other across the magazine center line A2. The first guide rail 64 and the second guide rail 65 slide against the feeder member 461 described later on a portion of the side surface exposed from the inner wall (surface on the magazine center line A2 side) of the base 455.

Figure 7:
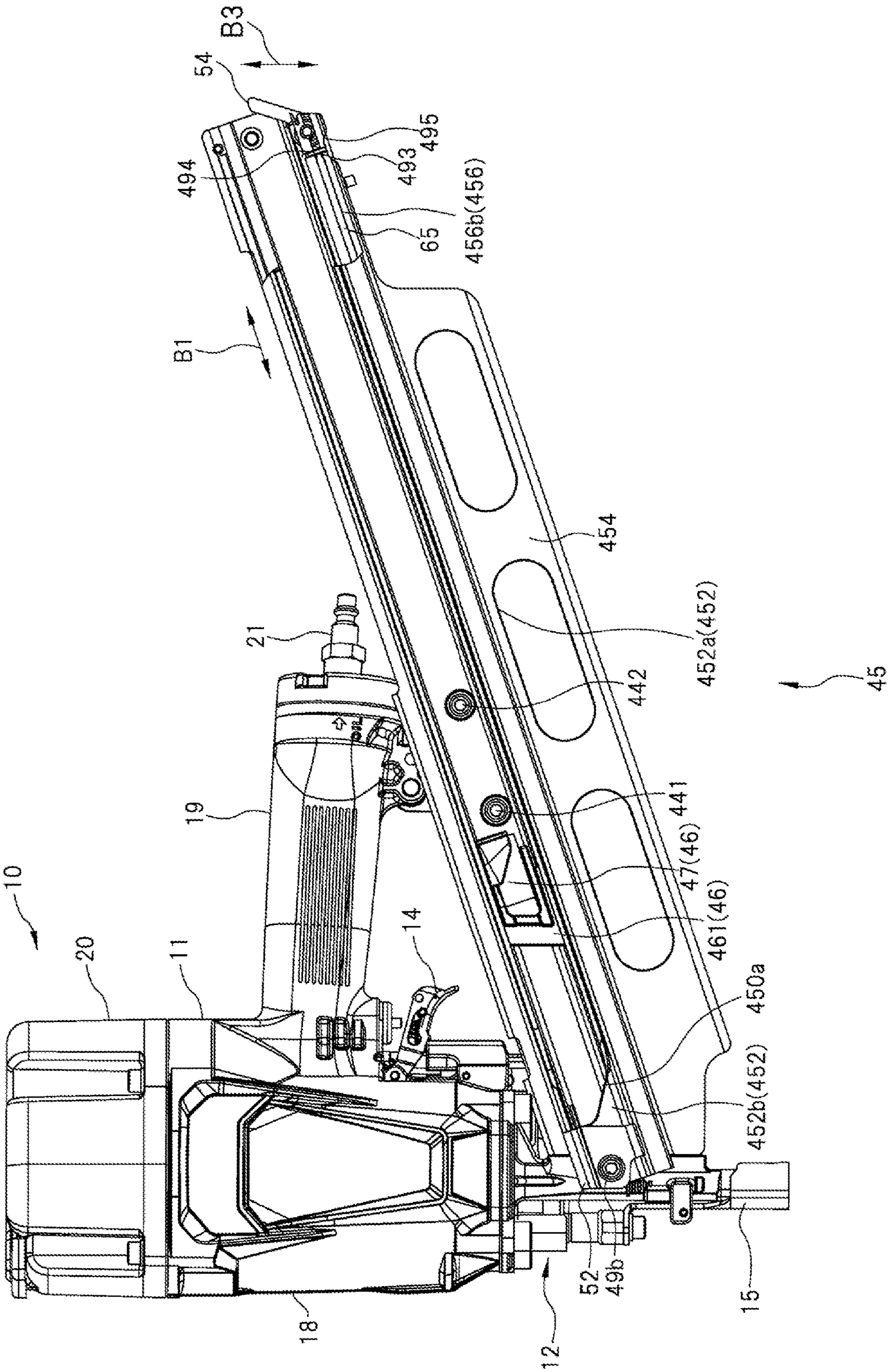
FIG. 7 is a cross-sectional view illustrating a portion of the inside of a magazine part of the nailing machine illustrated in FIG. 6.

As illustrated in FIG. 2A and FIG. 7, a hole 493 is formed along a third direction B3 orthogonal to the first direction B1 in the vicinity of a rear end of the base 455*b*. The hole 493 is formed by subjecting the wall 451 manufactured by extrusion molding to post-machining. A pin 494 is inserted into the hole 493 from the bottom surface 455*d*. The pin 494 inserted into the hole 493 protrudes from the fitting part 456*b* in the vicinity of the rear end of the base 455*b*. Accordingly, the pin 494 functions as a pullout prevention part that prevents the second guide rail 65 inserted into the fitting part 456*b* from falling out on the rear end side.

As illustrated in FIG. 2A, a hole 491 is formed along the third direction B3 orthogonal to the first direction B1 in the vicinity of a rear end of the base 455*a*. The hole 491 is formed by subjecting the wall 451 manufactured by extrusion molding to post-machining. A pin 492 is inserted into the hole 491 from the bottom surface 455*c*. Like the pin 494 described above, the pin 492 inserted into the hole 491 protrudes from the fitting part 456*a* in the vicinity of the rear end of the base 455*a*. Accordingly, the pin 492 functions as a pullout prevention part that prevents the first guide rail 64 inserted into the fitting part 456*a* from falling out on the rear end side.

As illustrated in FIG. 2A and FIG. 7, on the bottom surfaces 455*c* and 455*d* of the base 455, a recess 495 is formed in a predetermined range centered on the holes 491 and 493 into which the pins 492 and 494 are respectively inserted. The recess 495 is formed by subjecting the wall 451 manufactured by extrusion molding to post-machining. For example, when loading nails into the magazine part 45, the user is able to perform an operation of moving the feeder part 46 to the rear end of the magazine part 45 while holding the magazine part 45 with the user's finger hooked into the recess 495.

After the first guide rail 64, the second guide rail 65, and the third guide rail 66 are mounted on the magazine part 45, a stopper 60 is mounted at the rear end of the magazine part 45. The mounted stopper 60 is fixed to the rear end of the magazine part 45 by a bolt 61 and a nut 62 via a washer 63.

<Feeder Part 46>

Figure 11A:
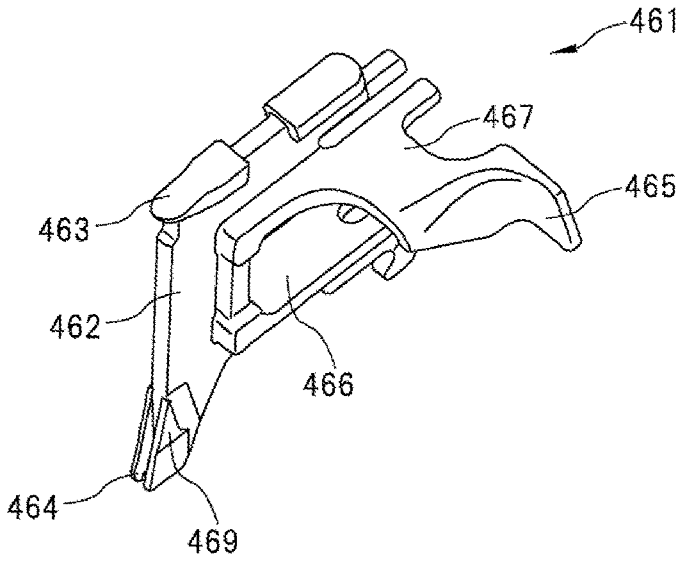
FIG. 11A is an external perspective view of a feeder member.
Figure 11B:
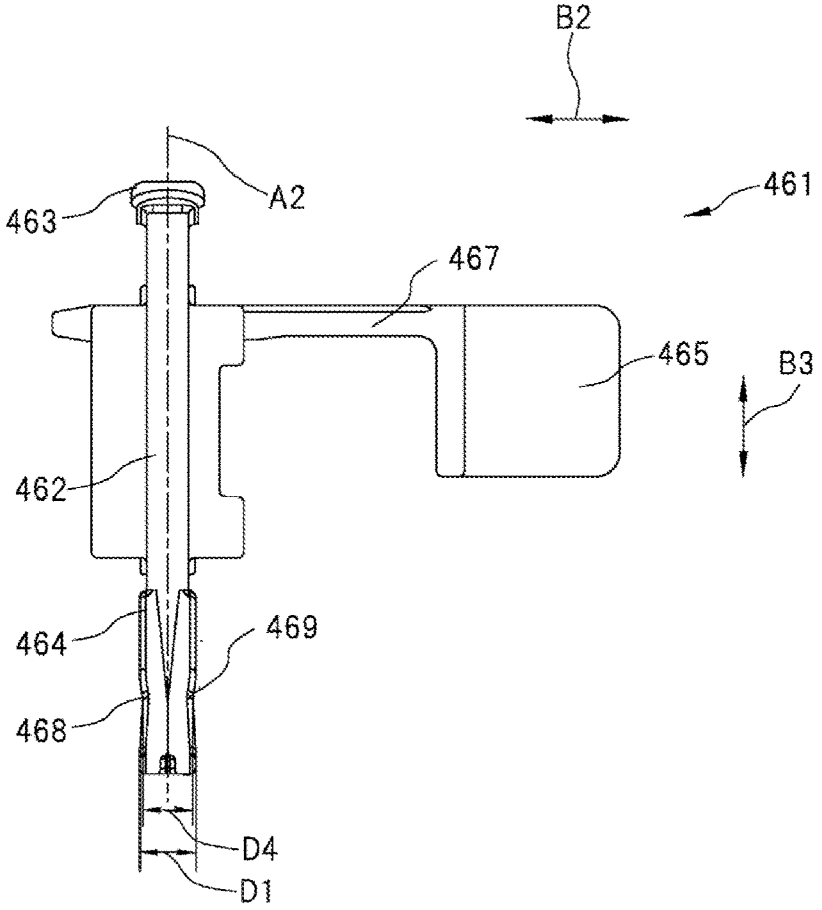
FIG. 11B is a front view of the feeder member.

As illustrated in FIG. 11A and FIG. 11B, the feeder member 461 includes a main body 462, the upper part 463, the contact part 464, and an operation part 465. The main body 462 is a plate-like member. A rear end of the main body 462 is notched, and an attachment part 466 attaching the coil spring 47 is formed. The upper part 463 is formed above the main body 462, and is accommodated in the third accommodation space 483 defined by the third wall 454 of the magazine part 45 (see FIG. 5). The operation part 465 is a member having a surface parallel to the second direction B2 and the third direction B3, and is operated by the user when loading nails into the magazine part 45. In this case, by putting their finger on the operation part 465 and moving the operation part 465 rearward along the first direction B1, the user is able to move the feeder part 46 to the rear end of the magazine part 45. The operation part 465 is connected to the main body 462 by a connecting member 467.

The contact part 464 is formed on the ejection part 12 side below the main body 462. The feeder member 461 comes into contact with a nail accommodated in the magazine part 45 at the contact part 464. The contact part 464 has a width greater than a width of the main body 462 in a direction along the second direction B2. That is, a width D1 of the contact part 464 illustrated in FIG. 12 is smaller than a distance D2 between the base 455*a* and the base 455*b*, and greater than a gap (separation distance) D3 between the first guide rail 64 and the second guide rail 65.

In the contact part 464, a sliding part 468 and a sliding part 469 are formed that slide against the first guide rail 64 and the second guide rail 65 when the feeder member 461 moves along the first direction B1. The sliding part 468 is a groove (first groove) formed in a position facing the first guide rail 64, and the sliding part 469 is a groove (second groove) formed in a position facing the second guide rail 65. The sliding parts 468 and 469 are formed along the first direction B1, that is, the direction in which the feeder member 461 moves within the magazine part 45.

Figure 12:
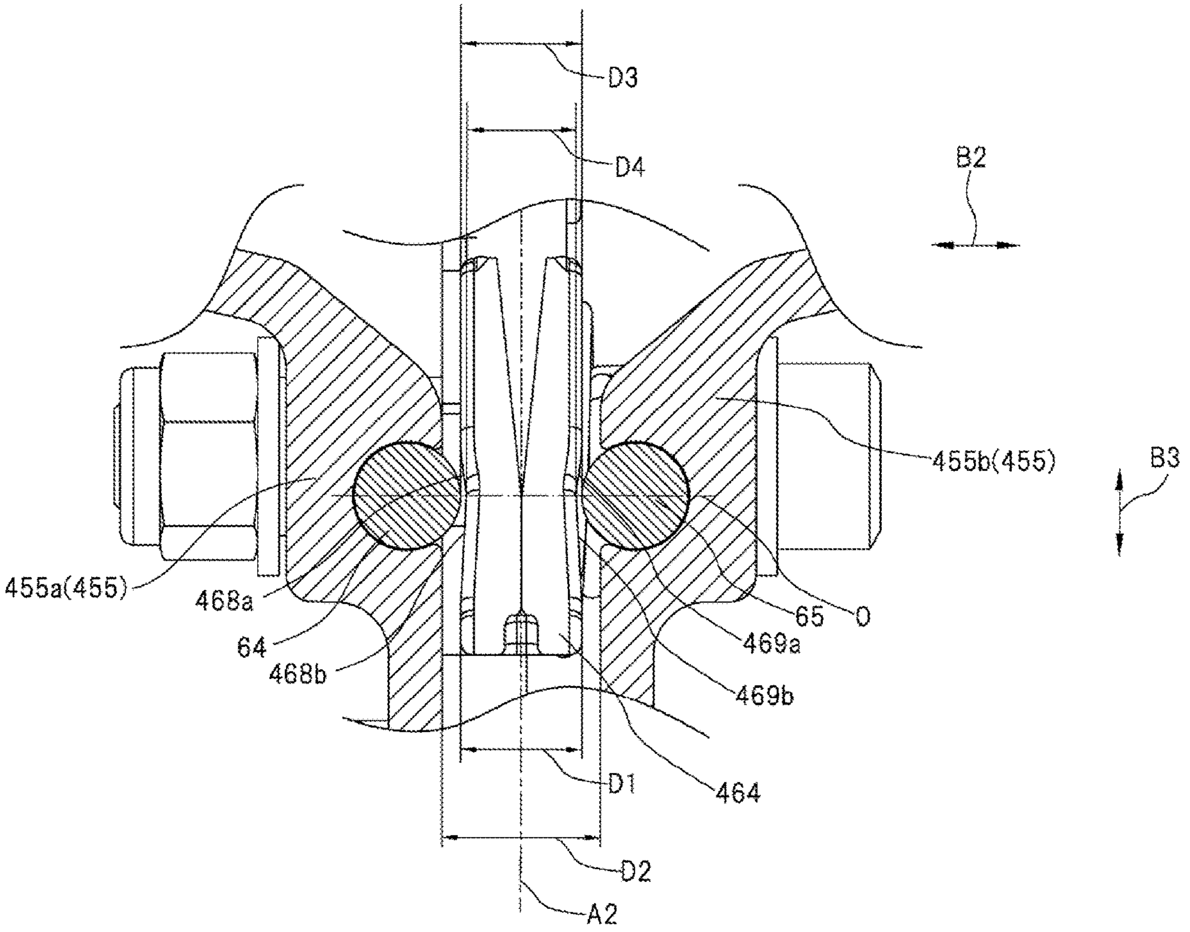
FIG. 12 is an enlarged cross-sectional view illustrating a portion of the structure of the nailing machine illustrated in FIG. 5.

As illustrated in FIG. 12, in a plane orthogonal to the first direction B1, on one side in the third direction B3 orthogonal to the first direction B1 and the second direction B2 (that is, the handle 19 side above a straight line O connecting the center of the first guide rail 64 and the center of the second guide rail 65) of the sliding parts 468 and 469, an arc sliding part 468*a* and an arc sliding part 469*a* are provided having a shape corresponding to an outer shape of the first guide rail 64 and the second guide rail 65, that is, an arc shape, in cross section. A curvature of the arc of the arc sliding parts 468*a* and 469*a* is larger than a curvature of an outer peripheral surface of the first guide rail 64 and the second guide rail 65. On the other side in the third direction B3 (that is, side below the straight line O connecting the center of the first guide rail 64 and the center of the second guide rail 65) of the sliding parts 468 and 469, a linear sliding part 468*b* and a linear sliding part 469*b* are provided having a linear shape in cross section. That is, the lower side of the sliding parts 468 and 469 is formed in a planar shape (inclined surface shape). The linear sliding parts 468*b* and 469*b* may have an arc shape with a larger curvature than that of the arc sliding parts 468*a* and 469*a*. A portion where an end of the arc shape and an end of the linear shape in the cross-sectional shape of the sliding parts 468 and 469 are connected is a position in the sliding parts 468 and 469 that is closest to the magazine center line A2.

A distance D4 between a position where the sliding part 468 is closest to the magazine center line A2 and a position where the sliding part 469 is closest to the magazine center line A2 is smaller than the width D1 of the contact part 464 and the separation distance D3 (see FIG. 12) between the first guide rail 64 and the second guide rail 65. Accordingly, the contact part 464 is able to move along the first direction B1 between the first guide rail 64 and the second guide rail 65 exposed on the magazine center line A2 side with respect to the base 455.

<Fixation of Feeder Part 46 and Magazine Part 45>

Figure 10:
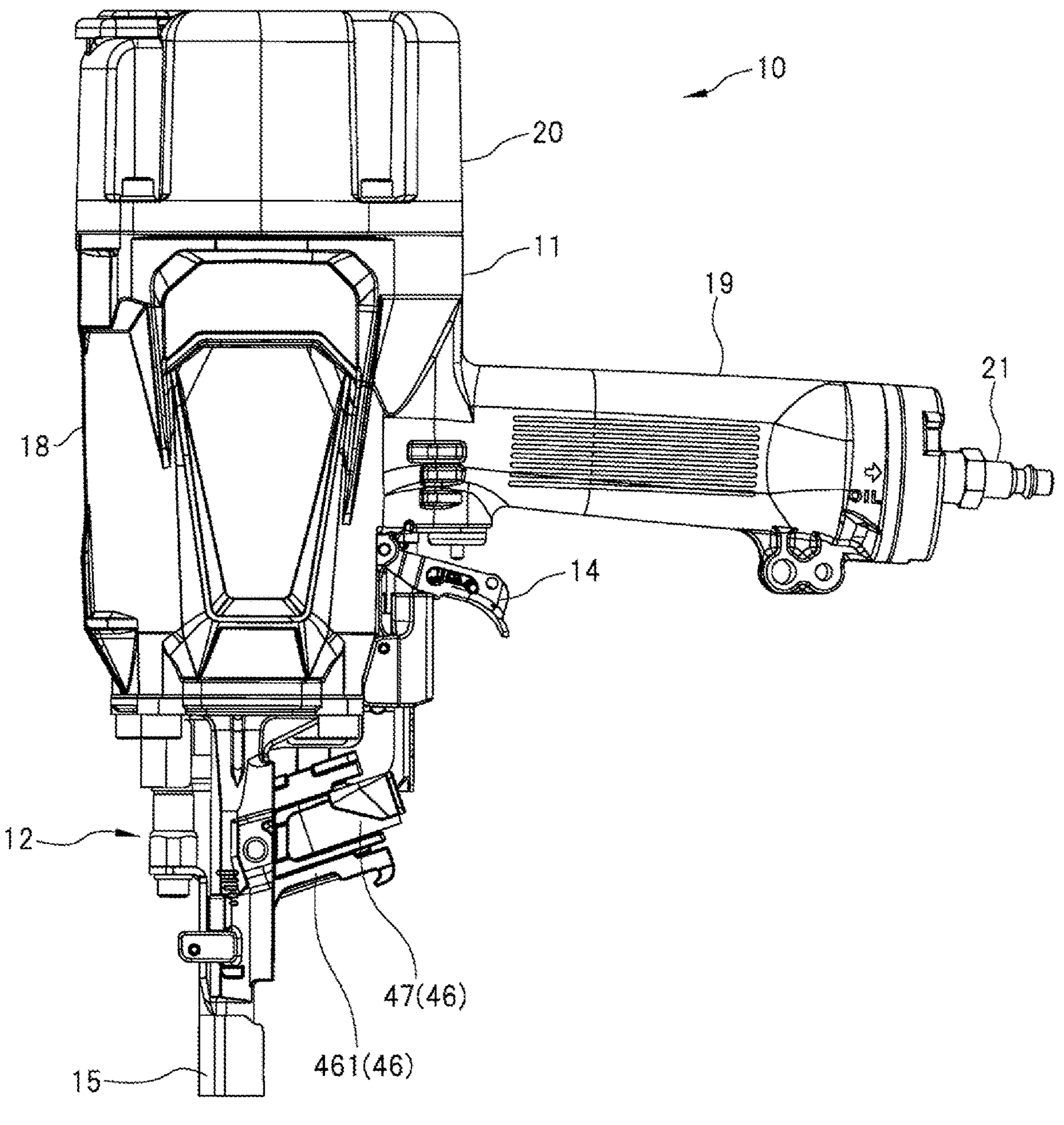
FIG. 10 is a side view illustrating a state in which the magazine part has been removed from the nailing machine illustrated in FIG. 9.

As illustrated in FIG. 10, the feeder member 461 and the coil spring 47 are attached to the ejection part 12. With the feeder part 46 attached to the ejection part 12, the magazine part 45 is attached to the ejection part 12. In this state, the magazine part 45 is attached to the ejection part 12. At this time, attachment is performed by sliding the magazine part 45 so that the connecting member 467 (see FIG. 11A and FIG. 11B) of the feeder member 461 passes through the slit 450 (see FIG. 9) formed at the tip (ejection part 12 side) of the magazine part 45. Accordingly, workability in attaching the magazine part 45 to the housing 11 is improved.

At the tip on the ejection part 12 side, the magazine part 45 is fixed with the ejection part 12 by a bolt 49*a* via a first guard 51 and a washer 50, and is fixed with the ejection part 12 by a bolt 49*b* via a second guard 52 and the washer 50 (see part C in FIG. 4).

As described with reference to FIG. 8C, the magazine part 45 is fixed with the handle 19 via the handle arm 42. Specifically, the handle arm 42 is fixed to the fixed region 452*e* of the first wall 452 constituting the magazine part 45 via the bolts 441 and 442 as well as the nuts 445 and 446 (part A and part B in FIG. 4).

According to the above-described embodiment, the following may be achieved.

(1) The magazine part 45 includes the first guide rail 64 and the second guide rail 65 arranged apart in the second direction B2 orthogonal to the first direction B1 and facing each other with the feeder member 461 therebetween. Accordingly, while the contact part 464 of the feeder part 46 contacts the first guide rail 64 and the second guide rail 65, since the contact part 464 does not contact the wall 451 of the magazine part 45, occurrence of damage or deformation in the magazine part 45 can be suppressed. Hence, it is possible to change the material of the magazine part 45 from iron, which has been conventionally used, to a material with relatively low hardness and a light weight, such as aluminum, and workability can be improved due to weight reduction of the magazine part 45.

(2) The gap D3 between the first guide rail 64 and the second guide rail 65 in the second direction B2 is smaller than the width D1 of the contact part 464 of the feeder member 461 in the second direction B2. In other words, a thickness (width D1) of the contact part 464 in the second direction B2 is greater than the gap D3 between the first guide rail 64 and the second guide rail 65 in the second direction B2. The contact part 464 includes the sliding parts

468 and 469 being grooves extending along the first direction B1. Accordingly, even if the number of nails is reduced and the feeder part 46 is struck by the striking part 13, the strength of the feeder part 46 against impact can be improved.

(3) In the plane orthogonal to the first direction B1, the sliding parts 468 and 469 have an arc shape in cross section on one side (upper side) in the third direction B3, and have a linear shape in cross section on the other side (lower side) in the third direction B3. Accordingly, even if the feeder member 461 receives a force from below upward due to an impact force generated when a nail is driven into the mating material 17, due to the cross-sectional shape of the lower side of the sliding parts 468 and 469, the stress received by the feeder member 461 from the first guide rail 64 and the second guide rail 65 can be reduced, and damage to the feeder member 461, the first guide rail 64 and the second guide rail 65 can be suppressed.

(4) The first guide rail 64 and the second guide rail 65 are formed in a columnar shape extending in the first direction B1 and slide against the feeder member 461 on a side surface. The base 455 includes the fitting part 456 to which the first guide rail 64 and the second guide rail 65 are fitted so that a portion of the side surface of the first guide rail 64 and the second guide rail 65 is exposed. The pins 492 and 494 being pullout prevention parts are inserted through the base 455 so as to protrude from the fitting part 456. Accordingly, without addition of another part such as a cover to the rear end of the magazine part 45, the first guide rail 64 and the second guide rail 65 are prevented from falling out of the magazine part 45 by a simple configuration. Since there is no need to add another part such as a cover to prevent the first guide rail 64 and the second guide rail 65 from falling out, an increase in weight of the magazine part 45 can be suppressed.

(5) The pins 492 and 494 are inserted through the base 455 along a direction orthogonal to the first direction B1 from the bottom surfaces 455*c* and 455*d* of the base 455. Accordingly, since movement of the first guide rail 64 and the second guide rail 65 to the rear end along the first direction B1 is restricted by the pins 492 and 494, the first guide rail 64 and the second guide rail 65 are prevented from falling out of the magazine part 45.

(6) The bottom surfaces 455*c* and 455*d* of the base 455 include the recess 495 centered on the position through which the pins 492 and 494 are inserted. Accordingly, for example, when loading nails into the magazine part 45, the user is able to perform an operation of moving the feeder part 46 to the rear end of the magazine part 45 while holding the magazine part 45 with the user's finger hooked into the recess 495, and usability is improved.

(7) The magazine part 45 includes the first wall 452 of a plate-like shape that defines the accommodation space 48 accommodating the feeder part 46 and allows the bolts 441 and 442 being a plurality of fixing members to be inserted therethrough. The first wall 452 includes the large diameter holes 443*b* and 444*b* being a plurality of accommodation parts accommodating the large diameter portions 441*b* and 442*b* respectively provided in a plurality of bolts 441 and 442. Accordingly, problems such as that the large diameter portions 441*b* and 442*b* of the bolts 441 and 442 protrude into the accommodation space 48 and contact the feeder part 46 are prevented from occurring.

(8) In the first wall 452, the fixed region 452*e* in which a plurality of large diameter holes 443*b* and 444*b* are formed has a greater thickness than other regions. Since a portion of the wall 451 of the magazine part 45 manufactured by extrusion molding may have a thickness enabling accommodation of the large diameter portions 441*b* and 442*b* of the bolts 441 and 442, protrusion of the bolts 441 and 442 into the accommodation space 48 is suppressed. Hence, aluminum, which is difficult to manufacture by press molding like iron and is preferably manufactured by extrusion molding, can be used as a material of the magazine part 45, and workability can be improved due to weight reduction of the magazine part 45.

In the above, various embodiments and modifications have been described. However, the disclosure is not limited thereto. Other aspects conceivable within the scope of the technical idea of the disclosure are also included in the scope of the disclosure.

What is claimed is:

1. A work machine, comprising:

an ejection part to which a fastener is supplied;

a striking part, striking the fastener supplied to the ejection part;

a magazine part, having one end in a first direction attached to the ejection part, and movably supporting the fastener in the first direction; and a feeder part, supported by the magazine part while being movable in the first direction, and pushing the fastener toward the one side in the first direction, wherein the feeder part comprises a contact part that comes into contact with the fastener;

the magazine part comprises a first rail and a second rail that are arranged apart in a second direction orthogonal to the first direction and facing each other with the feeder part therebetween; and a gap between the first rail and the second rail in the second direction is smaller than a width of the contact part in the second direction.

2. The work machine according to claim 1, wherein the contact part comprises a groove extending along the first direction.

3. The work machine according to claim 2, wherein in a plane orthogonal to the first direction, a cross section of the groove on one side in a third direction orthogonal to the first direction and the second direction has an arc shape, and the cross section of the groove on the other side in the third direction has a linear shape.

4. The work machine according to claim 2, wherein the groove comprises a first groove facing the first rail and a second groove facing the second rail; and the feeder part slides against the first rail and the second rail at the first groove and the second groove.

5. The work machine according to claim 1, wherein the magazine part is made of aluminum or an aluminum alloy.

6. A work machine, comprising:

an ejection part to which a fastener is supplied;

a striking part, striking the fastener supplied to the ejection part;

a magazine part, having one end in a first direction attached to the ejection part, and movably supporting the fastener in the first direction; and a feeder part, supported by the magazine part while being movable in the first direction, and pushing the fastener toward the one side in the first direction, wherein the magazine part comprises a base that is formed in a columnar shape extending in the first direction and defines an accommodation space accommodating the feeder part, a rail part that slides against the feeder part on a side surface, a fitting part that is provided on the base and has a groove shape extending along the first direction to which the rail part is movably fitted so that a portion of the side surface of the rail part is exposed, and a pullout prevention part that is inserted through the base so as to protrude from the fitting part, wherein the pullout prevention part is disposed in a position abutting the rail part in a case when the rail part moves towards the first direction.

7. The work machine according to claim 6, wherein the base has a bottom surface extending along the first direction; and the pullout prevention part is inserted through the base along a direction orthogonal to the first direction from the bottom surface.

8. The work machine according to claim 7, wherein the bottom surface comprises a recess centered on a position through which the pullout prevention part is inserted.

9. The work machine according to claim 6, wherein the magazine part is made of aluminum or an aluminum alloy.

10. A work machine, comprising:

an ejection part to which a fastener is supplied;

a striking part, striking the fastener supplied to the ejection part;

a magazine part, having one end in a first direction attached to the ejection part, and movably supporting the fastener in the first direction;

a feeder part, supported by the magazine part while being movable in the first direction, and pushing the fastener toward the one side in the first direction;

a housing, supporting the ejection part and the striking part; and a plurality of fixing members, comprising a shaft and a large diameter portion, and fixing the magazine part to the housing by inserting the shaft through the magazine part and the housing, wherein the magazine part comprises a wall of a plate-like shape that defines an accommodation space accommodating the feeder part and allows the plurality of fixing members to be inserted therethrough; and the wall comprises a plurality of large diameter holes that are recessed from a surface of the accommodation space and are spaced apart from each other, wherein each of the large diameter holes respectively accommodates the large diameter portion provided in each of the plurality of fixing members.

11. The work machine according to claim 10, wherein a region in which the plurality of accommodation parts are formed in the wall has a greater thickness than other regions.

12. The work machine according to claim 10, wherein the magazine part is made of aluminum or an aluminum alloy.

* * * * *